United States Patent [19]

Parks

[11] Patent Number: 4,618,465

[45] Date of Patent: Oct. 21, 1986

[54] METHOD AND APPARATUS FOR FORMING A THREAD PROFILE IMPRESSION

[75] Inventor: Jimmy C. Parks, Houston, Tex.

[73] Assignee: Smith International, Inc., Newport Beach, Calif.

[21] Appl. No.: 371,394

[22] Filed: Apr. 26, 1982

[51] Int. Cl.⁴ .............................................. B29C 33/40
[52] U.S. Cl. ............................. 264/40.1; 33/199 R; 249/166; 264/220; 264/318
[58] Field of Search .............. 264/40.1, 220, DIG. 44, 264/318; 425/171, 173, 458, 459; 33/199 R; 249/166

[56] References Cited

U.S. PATENT DOCUMENTS 590,486  9/1897  Sawyer ............................ 33/199 R
2,755,510  7/1956  Rauter ............................ 264/40.1

Primary Examiner—Donald Czaja
Assistant Examiner—Jennifer E. Cabaniss
Attorney, Agent, or Firm—Murray Robinson; David A. Rose; William E. Shull

[57] ABSTRACT

A pin thread profile mold includes two parallel spaced apart plate type thread profile gages. A cast is made with the mold positioned adjacent the thread with the plates parallel to the thread axis and the plane midway therebetween radial to the thread axis, the mold-thread interface being caulked with clay. After being placed adjacent the thread the mold is packed with self hardening plastics material in the plastic state, such as dental plaster. After the plastics material has hardened the cast is removed from the thread and sent to a laboratory for comparison with a desired profile.

5 Claims, 5 Drawing Figures

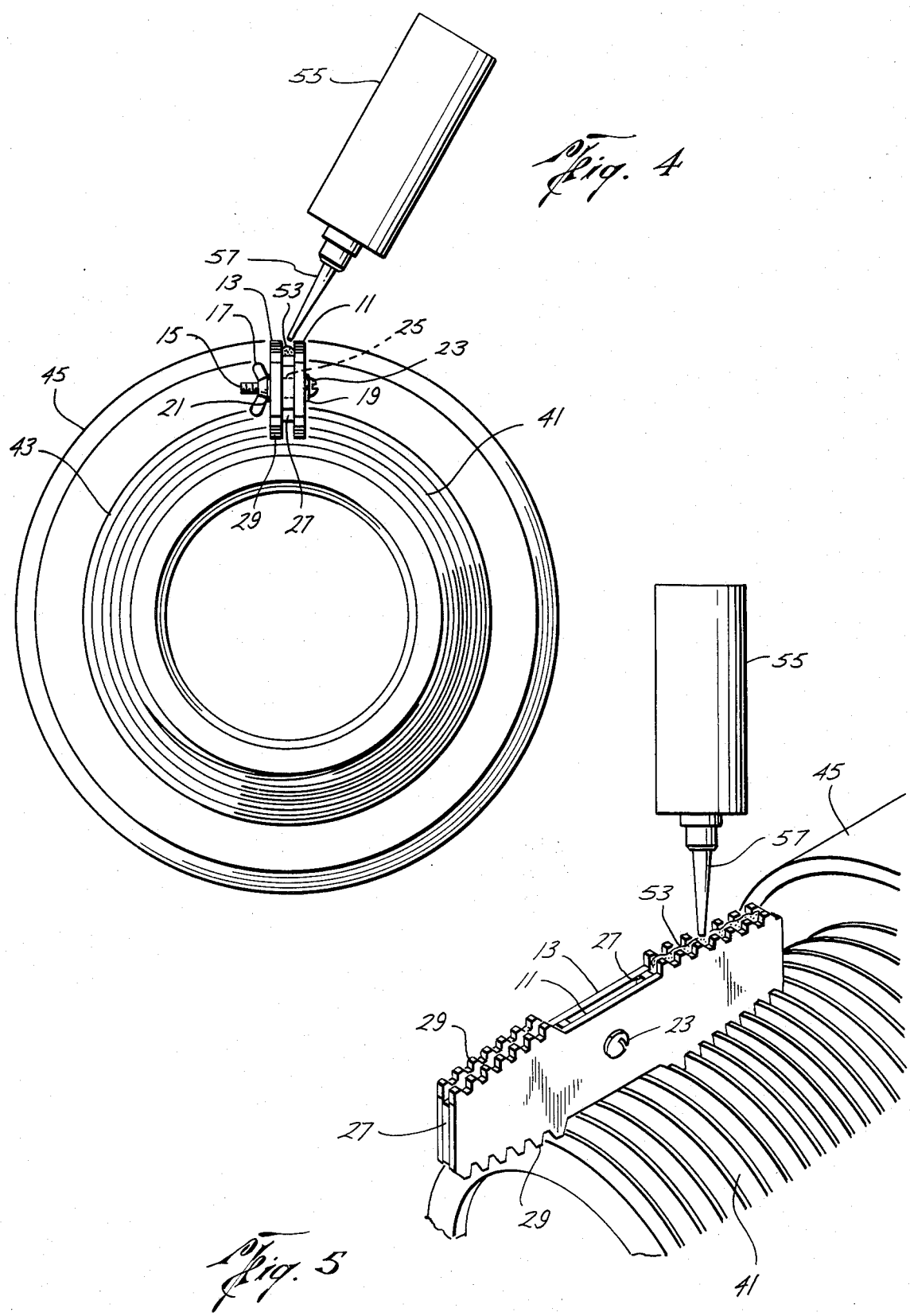

METHOD AND APPARATUS FOR FORMING A THREAD PROFILE IMPRESSION

SUMMARY OF INVENTION

A mold comprises two flat plate type pin thread gages connected together in parallel spaced apart position. The mold is placed on a pin thread with the plates parallel to the pin axis and the plane midway between the plates radial to the thread axis and the thread gage profiles engaging the pin thread, the gage crests fitting into spaces between the turns of the pin thread. The junctures of the mold plates and the pin are caulked with clay. The space between the mold plates adjacent the pin is fitted with dental plaster in the plastic state and the plaster is allowed to harden in situ to form a thread profile cast. The clay is removed, the plates are disconnected and the cast lifted from the pin and sent to the laboratory for inspection.

ADVANTAGES OF THE INVENTION

Visual comparison of a pin thread with a flat plate type thread gage does not accurately indicate the magnitude of departure from the norm, so that it cannot be precisely determined if the thread profile is within tolerances.

A plaster cast of a thread profile made without a mold is apt to be imperfect because of the difficulty in packing the plaster into the spaces between thread turns into close proximity with the thread.

The mold and casting procedure of the invention overcome the foregoing disadvantages whereby results are accurate and repeatable.

BRIEF DESCRIPTION OF THE DRAWINGS

For a detailed description of a preferred embodiment of the invention reference will now be made to the accompanying drawings wherein:

FIGS. 3-5 illustrate the method of use of the mold in accordance with the invention, FIG. 3 being a side view of a tool joint threaded pin and the mold, FIG. 4 being an end view of the tool joint and mold, and FIG. 5 being a pictorial view of the tool joint and mold.

DESCRIPTION OF PREFERRED EMBODIMENT

Figure 1:
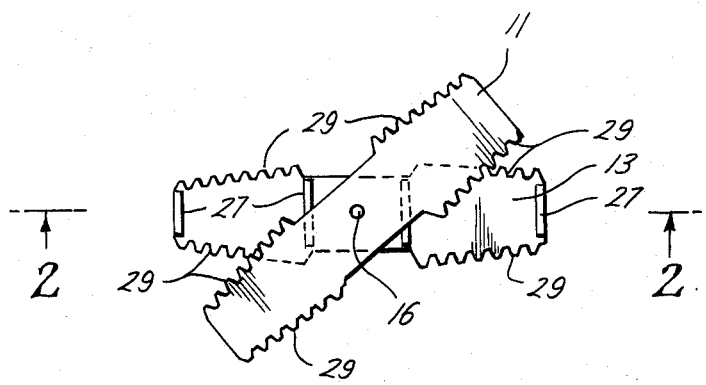
FIG. 1 is a side view of certain parts of a mold embodying the invention in a semi-assembled conditon.
Figure 2:
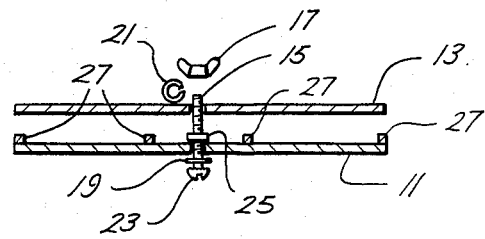
FIG. 2 is a plan view of the semi-assembled mold.

Referring now to FIGS. 1-4, there is shown a mold comprising two plate type pin thread profile gages 11, 13. The gages are connected together by a bolt 15, passing through holes 16 in the centers of the gages, and wing nut 17. To prevent the nut from coming loose, lock washers 19, 21 are provided, one to lie between plate 11 and head 23 of the bolt and the other between plate 13 and the nut. To provide a predetermined space between the plates, a short tube or ring 25 is slipped over the bolt between the plates. Also, short lengths of square cross-section key stock 27 are secured to the inside of plate 11, e.g. by silver solder. Tube 25 and keystock bars 27 provide spacers or stops limiting the approach of the plates when nut 17 is tightened.

The ends of plates 11, 13 are formed, e.g. serrated, as shown at 29, to be correlative to the desired pin thread profile, e.g. an Acme or similar pin thread having a taper as shown.

Figure 3:
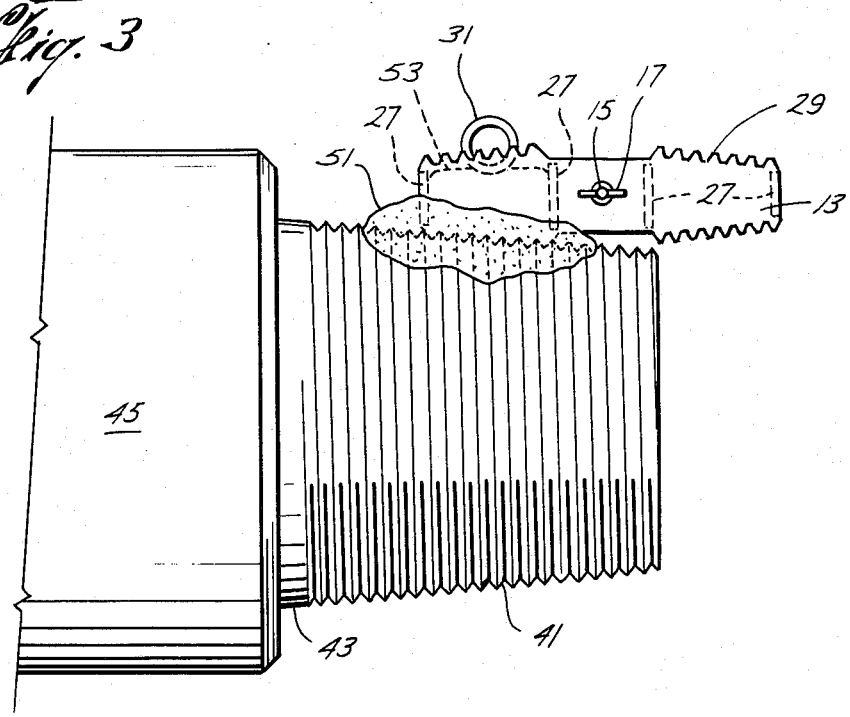

As shown in FIG. 3, a ring tab 31 is secured, e.g. by epoxy, to the inside one of the plates, e.g. plate 11, preferably being of the same thickness as bars 27 and washer 25 (which are of the same thickness as the bars) to fit snugly between the plates when the nut is tightened.

Referring now to FIGS. 3-5, according to the method of the invention the mold is placed adjacent tapered thread 41 on tool joint pin 43 at one end of pipe 45 or other fluid conduit or member to be connected with a screw thread.

The mold is placed so that the turns of thread 41 fit into the serrations on the ends of the plates 11, 13 and the plates are parallel to the axis of the tool joint, i.e. the helix axis of the thread and the plane midway between the plates is radial to the thread axis. Clay 51 is then employed to caulk the cracks at the interface between the mold and thread, as shown in FIG. 3. The clay is omitted from FIGS. 4 and 5 in the interest of clarity.

With the mold and clay in place, plastic dental plaster 53 is extruded from tube 55 via spout 57 into the space between the mold plates adjacent thread 41. With the aid of spout 57 or other tool, the plaster is packed tightly against the thread. After the plaster has solidified by air curing to form a cast of the thread profile, the clay is removed, the mold is disassembled and removed, and the cast is removed from the thread and sent to the lab. Or the cast can be lifted away from the thread while still held between the plates of the mold, with the clay previously removed or not.

While a preferred embodiment of the invention has been shown and described modifications can be made by one skilled in the art without departing from the spirit of the invention.

I claim:

1. A method for determining whether a thread conforms with a norm in the laboratory without having to transport the thread itself thereto comprising:

placing two flat plates having serrated edges that are correlative to the same thread in side-by-side, parallel and spaced apart position, thereby forming a gap therebetween;

securing the two plates in such side-by-side, parallel and spaced apart position;

positioning the two flat plates across the thread in such a manner that the serrations of the serrated edges are in mating engagement with the roots and the crests of the thread;

caulking the junctures of the serrated edges of the blades and the thread;

filling the gap with a self-curing plastic material;

packing the self-curing plastic material into the gap;

allowing the plastic material to harden to form a cast of the thread profile;

removing the cast from the gap;

sending the cast to the laboratory for inspection; and inspecting the cast of the thread profile for conformance with a norm.

2. An apparatus adapted to fit on the surface of a thread and to form a mold therewith for making a cast showing a profile of the thread comprising:

a first flat plate having a serrated portion with serrations correlative to the profile of the thread;

a second flat plate having a serrated portion with serrations also correlative to the profile of the same thread; and positioning means positioning said first and said second plates in side-by-side, parallel and spaced apart position, thereby forming a gap therebetween.

3. The apparatus of claim 2 wherein said positioning means includes:
   first spacing means being positioned between said first and said second plates, said first spacing means being positioned adjacent a first end of the serrated portions of said first and said second plates; and
   second spacing means being positioned between said first and said second plates, said second spacing means being separate from said first spacing means and being positioned adjacent a second end of the serrated portions of said first and said second plates.

4. The apparatus of claim 3 wherein said positioning means further include means for tightening said first and said second plates against said positioning means.

5. An apparatus adapted to fit on the surface of a thread and to form a mold therewith for making a cast showing a profile of the thread comprising:
   a first flat plate having a first hole therethrough and a serrated portion with serrations correlative to the profile of the thread;
   a second flat plate having a hole therethrough aligned with the hole of said first plate and a serrated portion with serrations also correlative to the profile of the thread, said second plate being placed in side-by-side, parallel and spaced apart position with said first plate, thereby forming a gap therebetween;
   a plurality of keystock bars having the same thickness, said bars being secured to the inside of said first plate between said first and said second plates, thereby providing spacers limiting the approach of the plates;
   a ring having the same thickness as said bars, said ring being aligned with the holes of said first and said second plates between said first and said second plates, thereby providing an additional spacer limiting the approach of the plates;
   a bolt passing through said ring and through the holes of said first and said second plates, said bolt having a bolt head on a first end;
   a first lock washer around said bolt between the exterior surface of said first plate and the bolt head;
   a second lock washer around said bolt, said second lock washer abutting the exterior surface of said second plate;
   a wing nut threaded over a second end of said bolt, said wing nut abutting said second lock washer, said wing nut tightening said first and said second plates against said bars, said ring, said first lock washer and said second lock washer;
   a ring tab being placed between said first and said second plate and being secured to the interior of said first plate.

* * * * *